United States Patent [19]
Glunt

[11] Patent Number: 5,219,106
[45] Date of Patent: Jun. 15, 1993

[54] GAME CARRIER FOR A VEHICLE

[76] Inventor: Vincent R. Glunt, 3457 Garden Ave., Indianapolis, Ind. 46222

[21] Appl. No.: 713,889

[22] Filed: Jun. 12, 1991

[51] Int. Cl.$^5$ .............................................. B60R 9/00
[52] U.S. Cl. ................................. 224/42.07; 224/317; 224/921; 248/503
[58] Field of Search ............. 324/273, 42.03 R, 42.07, 324/309, 517, 314, 325, 327, 42.32, 42.4, 42.43, 921, 42.42; 280/850, 769; 248/503; 296/77.1, 78.1, 194, 205, 206, 32, 34, 99.1, 132, 3; 414/462

[56] References Cited

U.S. PATENT DOCUMENTS

| | | | |
|---|---|---|---|
| 2,180,032 | 11/1939 | Casley | 224/42.03 R |
| 2,617,572 | 11/1952 | Knight | 224/309 |
| 2,779,524 | 1/1957 | Carlson | 224/42.08 X |
| 2,867,402 | 1/1959 | Graybill et al. | 248/231.6 |
| 3,181,755 | 5/1965 | Lingley | 224/42.03 R |
| 3,260,429 | 7/1966 | Hedgepeth | 224/42.07 |
| 3,718,225 | 2/1973 | Duren | 224/42.07 X |
| 3,822,801 | 7/1974 | Morgan, Jr. | 414/462 |
| 4,045,040 | 8/1977 | Fails | 280/1.5 |
| 4,283,068 | 8/1981 | Keyser | 280/19 |
| 4,335,891 | 6/1982 | Alley | 280/19 |
| 4,394,947 | 7/1983 | Tartaglia | 224/42.45 R |
| 4,431,121 | 2/1984 | Bensette | 224/153 |
| 4,483,471 | 11/1984 | Prosen | 224/314 |
| 4,538,752 | 9/1985 | Welter | 224/309 |
| 4,887,823 | 12/1989 | Hallett | 280/19 |
| 5,009,337 | 4/1991 | Bimbi | 224/320 X |

Primary Examiner—Henry J. Recla
Assistant Examiner—Glen T. Barrett
Attorney, Agent, or Firm—Woodard, Emhardt, Naughton, Moriarty & McNett

[57] ABSTRACT

A carrier mountable to an off-road-type vehicle for transporting harvested game has a game supporting platform with tubular framing and a substantially planar platform surface, is adapted to overlie the hood of the vehicle and has a bracket for attaching the platform over the hood of the vehicle.

9 Claims, 4 Drawing Sheets

GAME CARRIER FOR A VEHICLE

FIELD OF THE INVENTION

The present invention relates generally to the field of vehicle cargo carriers, and in particular to a carrier mountable to a sport or off-road utility vehicle and for transporting harvested game.

BACKGROUND OF THE INVENTION

Vehicle-mounted cargo carriers are generally well known. For example, U.S. Pat. No. 4,483,471 to Prosen discloses a carrier utilizing interlocking vertically offset tubular members and multiple intersecting tension members to provide a substantially rigid, yet resilient structure for carrying cargo. As is common in the art, Prosen's carrier is secured by adjustable straps to the trunk of a vehicle.

Carriers specifically adapted for use in transporting harvested game are also known. U.S. Pat. No. 3,822,801 to Morgan, Jr. discloses a V-shaped rack with a tubular frame and cross-members, and adjustable straps which connect opposite edges of the frame to the vehicle's bumper to permit the carrier to be raised from the ground when transporting game.

As the foregoing patents demonstrate, carriers are generally designed to be mounted on the roof, trunk or rear bumper of a vehicle so that the carrier and mounted game do not inhibit visibility while driving. In the case of sport or off-road vehicles such as the Jeep Wrangler or Suzuki Samuri, which have a soft or convertible top and no trunk, such carriers cannot be used.

What is needed is a carrier for game and the like for use with a sport or off-road utility vehicle.

SUMMARY OF THE INVENTION

A carrier for transporting harvested game or other similar cargo according to one embodiment of the present invention comprises a generally planar section to overlie and substantially cover the hood of a sport or off-road vehicle, and one or more brackets to attach the generally planar section to the body and front bumper of the vehicle.

One object of the present invention is to provide a carrier for transporting harvested game with a sport or off-road vehicle having neither a trunk nor a hard top.

Further objects and advantages of the present invention will be apparent from the following drawings and description.

DESCRIPTION OF THE PREFERRED EMBODIMENTS

Figure 1:
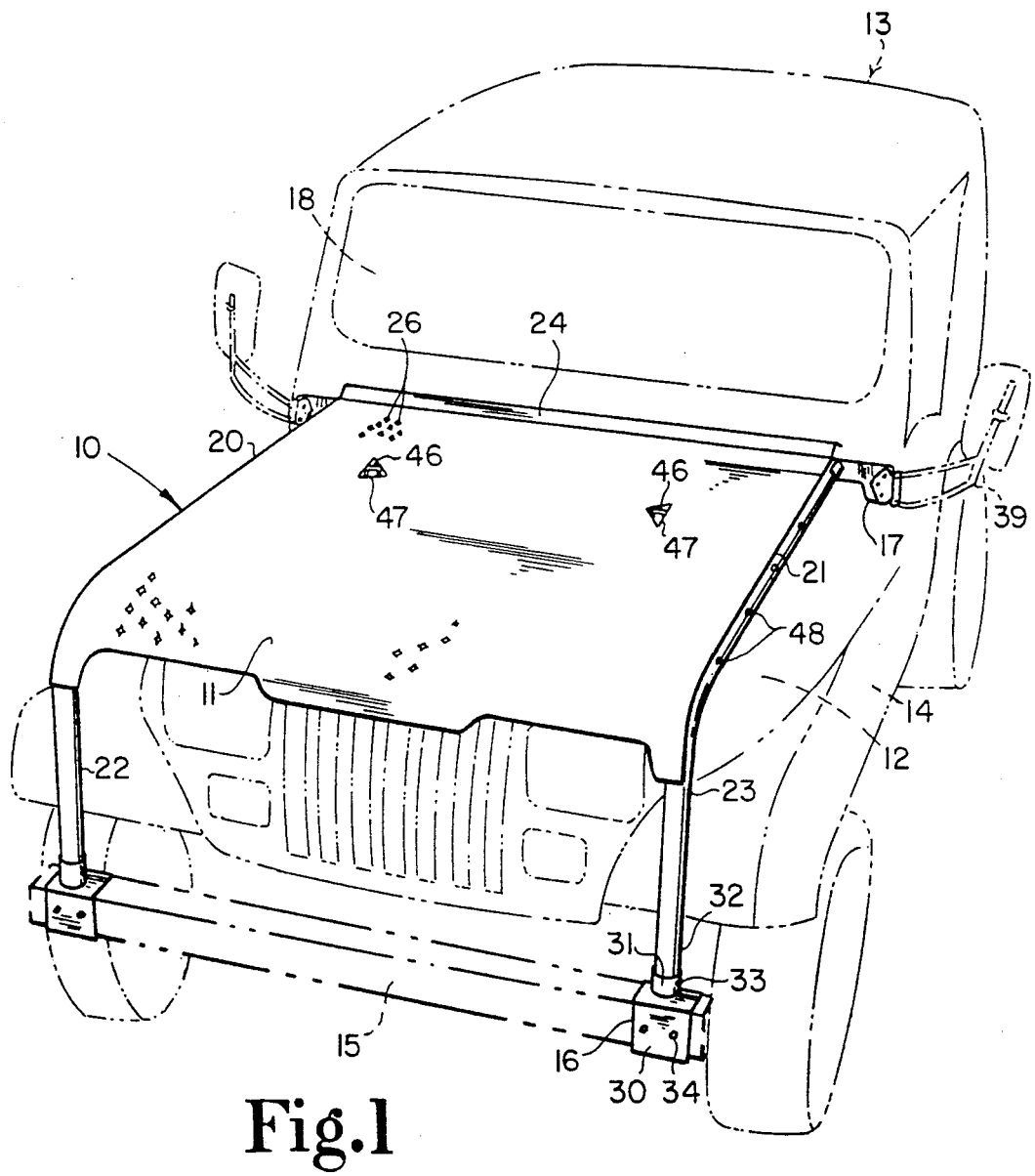
FIG. 1 is a perspective view of a game carrier installed on a vehicle in accordance with the preferred embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention relates.

Figure 4:
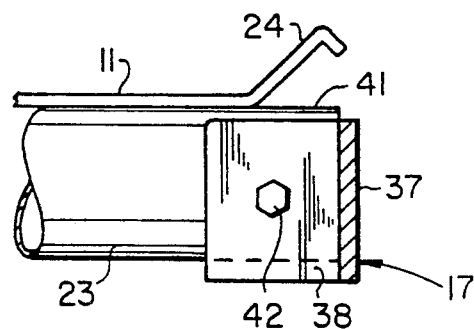
FIG. 4 is a side, partially cross-sectional view of the body bracket of FIG. 3, taken along the lines 4—4 and viewed in the direction of the arrows.

Referring now to FIG. 1, there is shown a carrier for transporting harvested game in accordance with the preferred embodiment of the present invention. In the embodiment shown in FIG. 1, carrier 10 has been adapted for use with a 1987 Jeep Wrangler (shown in phantom at 13). This vehicle 13 and similar off-road-type vehicles for which the present invention is specifically adapted, have soft or convertible tops and no trunk or rear surface which would readily permit the attachment of a device suited for transporting harvested game. Carrier 10 includes a generally planar platform 11 to overlie and substantially cover the hood 12 of the vehicle 13, and a means for mounting platform 11 to the body 14 and front bumper 15 of vehicle 13. In the illustrated embodiment, the mounting means includes a pair of bumper brackets 16 mounted to front bumper 15 of the vehicle, and a pair of body brackets 17 mounted on the body 14 of the vehicle just below the windshield 18. Platform 11 is generally planar and is supported by a pair of opposing and parallel frame members 22 and 23. Platform 11 is sized to extend beyond the length of hood 12 from roughly the vehicle frame at the base of windshield 18 to the vehicle front where platform 11 curves downwardly. The width of platform 11 is roughly 70% to 100% of vehicle 13 and preferably around 80% of the vehicle's width. Platform 11 is fixedly secured along its opposing side edges 20 and 21 to frame members 22 and 23 by appropriate means such as by welding. At its rear, platform 11 extends upwardly and rearwardly then downwardly to form a laterally extending backstop 24 (FIGS. 1 and 4). A plurality of spaced holes 26 are defined through the thickness along virtually the entire surface of platform 11 which reduce the overall weight of carrier 10. Frame members 22 and 23 are made of a rigid, light-weight and rust-resistant tubing material, such as aluminum tubing stock. Each frame member extends straight from its mounting at body bracket 17 below windshield 18 toward the front of vehicle 13 where it curves 90° downward and extends straight therefrom to its mounting at bumper bracket 16.

Figure 2:
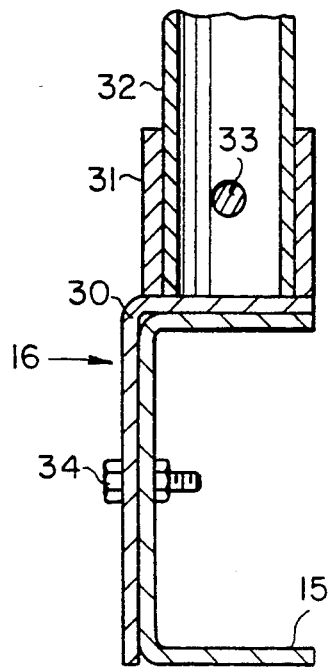
FIG. 2 is an enlarged, side cross-sectional view of one of the bumper brackets of the carrier of FIG. 1.

Referring to FIGS. 1 and 2, each bumper bracket 16 includes an angle member 30 and an open-ended cylindrical member 31 fixedly secured as by welding to the top of angle member 30. Cylindrical member 31 is adapted to receive therein the corresponding lower end 32 of a frame member 23. Appropriate fastening means such as a bolt and nut combination 33 extends through both cylindrical member 31 and end 32 to secure frame member 23 to bracket 16. Bracket 16 is in turn secured to bumper 15 by a pair of bolts 34. Alternative embodiments are contemplated which use quick-release fasteners instead of bolts to securely fasten frame member 23 to bracket 16 while facilitating rapid removal of carrier 10 from the vehicle when desired.

Figure 3:
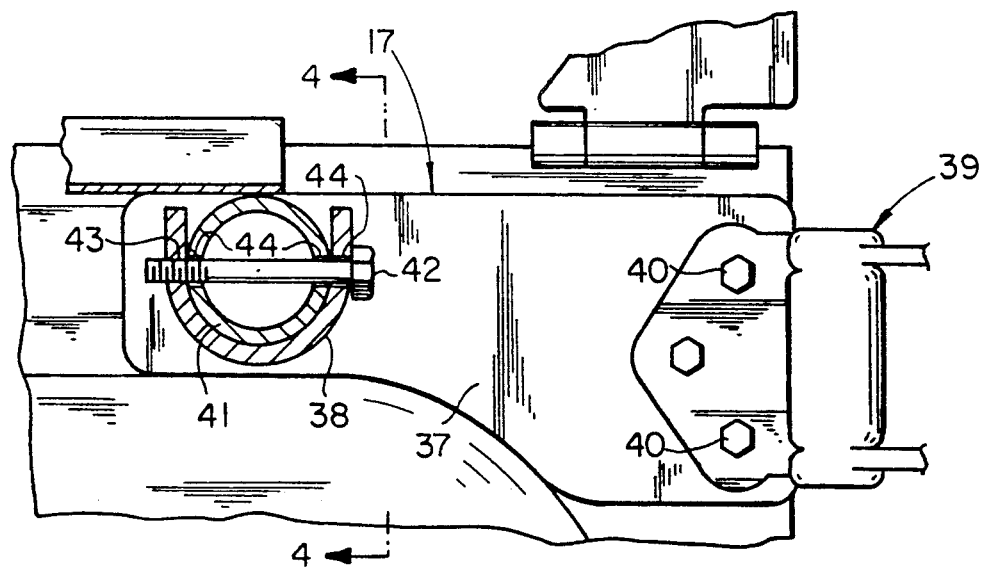
FIG. 3 is an enlarged, front partially cross-sectional view of the carrier of FIG. 1 showing one of the body brackets.

Referring to FIGS. 1, 3 and 4, body bracket 17 includes a face plate 37 and a U-shaped bracket 38 appropriately secured thereto as by welding. In the standard Jeep vehicle 13 depicted in the present embodiment, the side mirror assembly 39 is bolted to vehicle 13 by three bolts 40. Bracket 17 is adapted for easy mounting to vehicle 13 by having three holes which mutually align with the three holes in vehicle body 14 for bolts 40. Bracket 17 is thus mounted to vehicle 13 by removing bolts 40 and mirror assembly 39, and then reattaching assembly 39 using bolts 40, with bracket 17 sandwiched between vehicle 13 and assembly 39 and with bolts 40 extending through the now mutually aligned holes in bracket 17, mirror assembly 39 and vehicle 13.

U-shaped bracket 38 is adapted to receive therein the upper end 41 of one of the frame members 23. Frame member 23 is secured to bracket 38 by a bolt 42 which extends through aligned apertures 44 in both bracket 38 and upper end 41 and threadedly engages with threaded aperture 43 on the inside of U-shaped bracket 38. As with bumper bracket 16, bolt 42 of body bracket 17 may be replaced with a quick-release fastener to facilitate quick connection and removal of carrier 10 when desired.

The Jeep vehicle 13 of the present embodiment, like similar vehicles, has a pair of U-shaped tie-down hooks 46 extending upwardly from the vehicle's hood 12. Windshield 18 of vehicle 13 pivots forwardly at its base to a horizontal position atop the hood 12. Windshield 18 is secured thereat via hooks 46. Platform 11 defines a pair of openings 47 positioned to permit access to hooks 46.

With carrier 10 firmly secured to vehicle 13 as described above, harvested game may be secured atop carrier 10 by known means such as ropes attached directly to carrier 10 and/or hooks 46. The positioning of brackets 16 and 17 is such that there is sufficient clearance between the frame members 22 and 23 and the vehicle so that tie-down ropes may be passed between carrier 10 and vehicle 13 to facilitate various ways to secure the game to the platform 11. A number of holes 48 are defined in each of the frame members 22 and 23 to facilitate the use of cords or ropes with hooks on their ends such as a Bungee cord. The game may thus be transported in a convenient manner without taking up space inside the vehicle and avoiding the risk of soiling the inside of the vehicle.

Other embodiments are contemplated wherein carrier 10 may include a greater number of cross members and the platform may consist of a less rigid material such as a wire screen or mesh, the support coming primarily from the enhanced framing.

Figure 5:
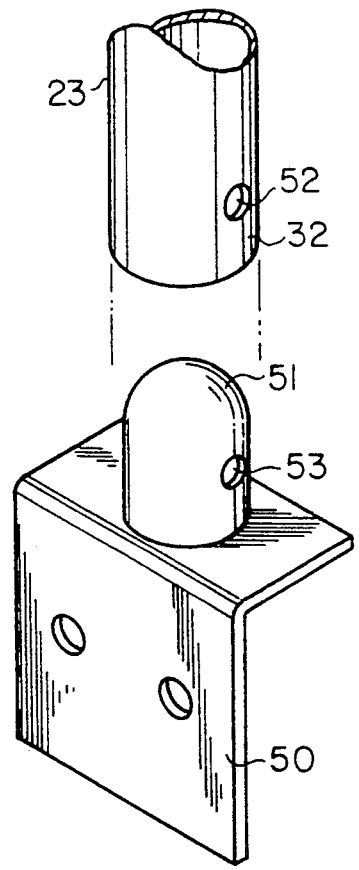
FIG. 5 is a perspective view of a bumper bracket in accordance with an alternative embodiment of the present invention.

In another embodiment shown in FIG. 5, a bumper bracket 50 includes an upstanding knob 51 which is adapted to be received in the lower end of each cylindrically-cross-sectioned frame member 22 and 23. Frame members 22 and 23 are then secured to the knobs 51 by a bolt extending through aligned apertures 52 and 53 in lower end 32 and knob 51, respectively.

Figure 6:
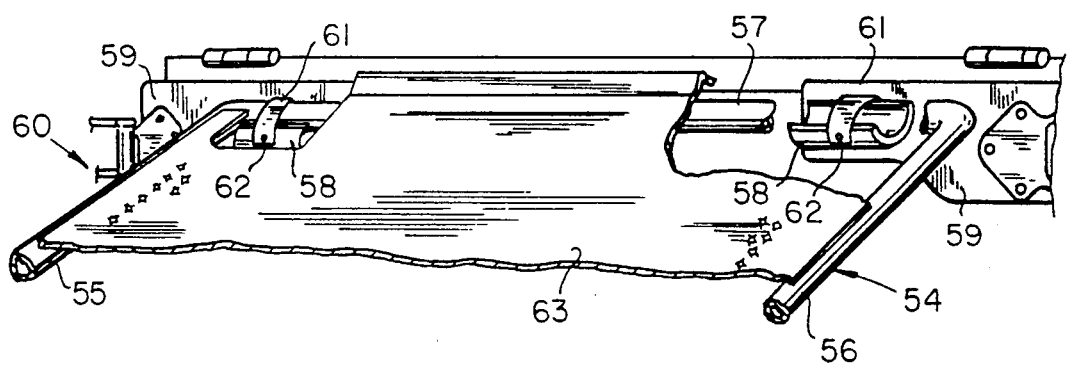
FIG. 6 is a perspective, partially fragmented view of a carrier, installed on a vehicle in accordance with an alternative embodiment of the present invention.

In another embodiment shown in FIG. 6, the frame member 54 is generally U-shaped, comprising a pair of spaced-apart, parallel legs 55 and 56 which are joined at their upper end by a mutually orthogonal cross leg 57. The U-shaped brackets 58 are in mutual, coaxial alignment and mounted to their body brackets 59 to receive therein the lateral cross leg 57 as shown in FIG. 6. An appropriate locking member 61 is adapted to close around cross leg 57 and be secured thereat by a fastener such as a bolt 62. The game-supporting platform 63 is then appropriately shaped to be mounted to frame member 54 and to permit access to locking members 61 and bolts 62. This configuration permits the carrier 60 to be pivoted about the axis of cross leg 57, which thus allows easier access to the hood and engine of vehicle 13 without completely removing carrier 60.

In alternative embodiments, a varying number of frame members may be used depending on the strength of the material used and on the intended usage. Also, platform 11 may be planar, as shown, or have a different surface configuration such as ridges.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A carrier mountable to an off-road-type vehicle having a hood, a body and a front bumper and for transporting harvested game thereon, comprising:

a game supporting platform adapted to overlie just the hood of an off-road-type vehicle;

bracket means for attaching said platform over just the hood of the vehicle, said bracket means including a pair of bumper brackets mountable to the front bumper of the vehicle and a pair of body brackets mountable to the body of the vehicle, the bumper brackets and the body brackets adapted to connect to said platform and secure said platform to the vehicle; and, wherein the vehicle includes at least one side mirror assembly having mounting means for mounting a mirror to the vehicle and wherein the body brackets are adapted to be mounted to the vehicle together with the mirror by the mounting means.

2. The carrier of claim 1 wherein said platform defines at its rear a backstop extending generally upwardly.

3. The carrier of claim 1 wherein said platform includes tubular framing having ends adapted to connect to corresponding bumper and body brackets.

4. The carrier of claim 3 wherein said vehicle includes a windshield and a front end, and wherein said platform has a front end and a rear, is generally planar and has a width less than the width of the vehicle and a length running from approximately the windshield of the vehicle to the front end of the vehicle.

5. The carrier of claim 4 wherein said platform curves downwardly at its front.

6. A method for providing transport for harvested game with an off-road-type vehicle having a body and a front bumper, comprising the steps of:

providing a carrier having a game supporting platform adapted to overlie a hood of an off-road-type vehicle and having bracket means for attaching said platform over the hood of the vehicle, the bracket means comprising a pair of bumper brackets mountable to the front bumper of the vehicle and a pair of body brackets mountable to the body of the vehicle;

fixedly securing the carrier to and over the hood of the vehicle by mounting the bumper brackets to the bumper of the vehicle and the body brackets to the body of the vehicle and connecting the platform to said body brackets and bumper brackets, wherein the vehicle includes at least one side mirror assembly having a mirror and mounting means for mounting the mirror to the vehicle and wherein both the mirror and one of the body brackets are secured to the vehicle with the mounting means; and securing the harvested game to and atop the platform.

7. The method of claim 6 wherein said providing step includes the platform having tubular framing having ends adapted to connect to corresponding bumper and body brackets.

8. The method of claim 6 wherein said vehicle includes a windshield and a front end, and wherein the providing step includes the platform having a front end and a rear, being substantially planar, having a width between 70% and 100% of the width of the vehicle, and extending from roughly the windshield of the vehicle to roughly the front end of the vehicle.

9. The method of claim 8 wherein the providing step includes the platform defining at its rear a backstop extending generally upwardly.

* * * * *